United States Patent [19]

Paul et al.

[11] Patent Number: 4,964,275

[45] Date of Patent: Oct. 23, 1990

[54] MULTICYLINDER COMPOUND ENGINE

[76] Inventors: Marius A. Paul; Ana Paul, both of 1100 E. Orangethorpe Ave., Ste. 140, Anaheim, Calif. 92801

[21] Appl. No.: 352,055

[22] Filed: May 15, 1989

Related U.S. Application Data

[62] Division of Ser. No. 132,017, Dec. 14, 1987, Pat. No. 4,843,821.

[51] Int. Cl.⁵ .............................................. F02B 33/36
[52] U.S. Cl. ................................... 60/605.1; 60/600; 123/51 BA; 123/65 B
[58] Field of Search ............... 60/605.1, 602, 600; 123/564, 51 BA, 65 B, 559.1

[56] References Cited

U.S. PATENT DOCUMENTS

| | | |
|---|---|---|
| 2,091,451 | 8/1937 | Phillips . |
| 2,375,006 | 5/1945 | Larrecq . |
| 2,468,157 | 4/1949 | Barlow et al. . |
| 2,525,460 | 10/1950 | Roesch . |
| 2,620,621 | 12/1952 | Nettel ................................ 60/606 |
| 3,228,183 | 1/1966 | Feller ............................. 60/605.1 |
| 4,291,535 | 9/1981 | Goloff ............................... 60/602 |
| 4,392,459 | 7/1983 | Chareire ............................ 123/21 |
| 4,469,055 | 9/1984 | Caswell ........................... 123/78 B |
| 4,572,116 | 2/1986 | Hedelin .......................... 123/78 D |
| 4,633,671 | 1/1987 | Schatz ............................ 60/605.1 |
| 4,656,992 | 4/1987 | Oonaka et al. ................ 123/564 X |
| 4,791,787 | 12/1988 | Paul et al. ...................... 60/605.1 |

FOREIGN PATENT DOCUMENTS

| | | |
|---|---|---|
| 3000145 | 7/1981 | Fed. Rep. of Germany ..... 60/605.1 |
| 571224 | 1/1924 | France ............................ 60/605.1 |
| 83634 | 5/1982 | Japan . |
| WO86/04388 | 7/1986 | PCT Int'l Appl. ................ 60/605.1 |

*Primary Examiner*—Michael Koczo
*Attorney, Agent, or Firm*—Bielen, Peterson & Lampe

[57] ABSTRACT

A compound rotary-reciprocal engine with multiple cylinders of a reciprocator component coupled to a positive displacement, rotary compressor-expander, with systems for coordinating the cycle timing of each cylinder with the timing of the rotary compressor-expander and with systems enabling the efficient operation of the coupled components as a unitary engine in a wide range of operating conditions.

12 Claims, 3 Drawing Sheets

MULTICYLINDER COMPOUND ENGINE

BACKGROUND OF THE INVENTION

This application is a divisional of application Ser. No. 132,017, filed Dec. 14, 1987, now U.S. Pat. No. 4,843,821.

This invention relates to a multicylinder reciprocal engine having an integral positive displacement, rotosupercharger for boosting compression in the pressures cylinder chambers for improved performance. The engine of this design relates to the invention titled REGENERATIVE THERMAL ENGINE, U.S. Pat. No. 4,791,787, issued Dec. 20, 1988. In the referenced patent application, the invention related to a single cylinder engine having positive displacement rotosupercharging with auxiliary turbocharged arrangements for developing the maximum power and efficiency possible for a single cylinder engine.

When coupling a positive displacement rotosupercharger to a reciprocal piston engine, provision must be made to prevent pressure loss between the coupled positively displaced rotosupercharger and the reciprocal cylinder engine. The particular advantage of a single cylinder engine is that the rotosupercharger can be directly coupled to the reciprocal engine and the cycle of the rotosupercharger components matched to the cycle of the reciprocator component with minimal dead space. In this manner the substantial compression achieved by the positive displacement rotosupercharger can be directly supplied to the reciprocator with minimal pressure and kinetic loss. The single cylinder embodiment, whether with one piston or two opposed pistons, is a unique arrangement.

When a positive displacement rotosupercharger is coupled to a multi-cylinder engine, however, the situation is substantially different. Such arrangement on the compression side requires an intermediate valve to sequentially connect each of the positively displaced rotosupercharger to the operative cylinder only at the time it is ready to deliver peak pressure developed in the compression cycle. Compressed air must be prevented from reentering the supercharger at the beginning of compression cycle. Where the connection path is short as in single cylinder systems, an open system results in small losses, the volume of the passage being added to the minimum displacement volume of the positive displacement compressor in calculating compression ratio.

Similarly, when the rotosupercharger utilizes the exhaust gases from the reciprocator the situation for a single cylinder reciprocator coupled to a positive displacement expander is substantially different than when a multiple cylinder reciprocator is integrally coupled to a single positive displacement expander. Again, in order to utilize the peak pressures developed in the reciprocator fully by the expander a distributor means must be interposed between the multicylinder reciprocator component and the positive displacement expander component.

In a prior art device of Kemp, German Pat. No. 3,000,145 issued July 1981, a multicylinder reciprocator engine is shown connected to a rotosupercharger having a positive displacement compressor and a positive displacement expander. Both the intake and exhaust of the multicylinder of the reciprocator are connected to an intermediate manifold that connects to a entire bank of cylinders. The use of a common manifold creates a large dead space into which the peak exhaust is sequentially dissipated without producing useful work. The high potential and kinetic energy of the expanded cylinder gases which are limited in volume, first expand into the exhaust manifold servicing all four cylinders, then, if any energy remains, expand into the supercharger expander. The common exhaust manifold is an effective sink rather than a directional path for reciprocator exhaust.

In a similar manner the peak pressure of the compressor side of the rotosupercharger in the Kemp system is not selectively directed into an individual cylinder of the reciprocator, but is diluted by the common intake manifold. Additionally, since the outlet passage of the rotary compressor in Kemp is exposed over a substantial duration of the rotary cycle, gases compressed by the previous cycle will backflow into the compressor chamber of the compressor portion of the rotosupercharger. The effective volume of the compressor then becomes a maximum volume of the positive displacement compressor plus the volume of the manifold and its accompanying service passages. The compressor rating then falls dramatically.

Such inefficiencies are multiplied by the number of cylinders serviced and the number of spaces in the rotor. The more cylinders, the more inefficient the rotor-supercharger becomes.

In addition to these inefficiencies in prior art devices, additional problems are encountered when utilizing a compound rotary-reciprocal engine. Since the preferred means of positive displacement supercharging is the Wankel-type configurations, means must be devised to compensate for the disparity in required volume between the compressor side and the expansion side when a common rotor is utilized to both compress and expand gases in conjunction with the demands and products of a reciprocal component. These various problems are solved by the arrangements described in this specification.

SUMMARY OF THE INVENTION

This invention relates to improvements in rotary-reciprocal compound engines and in particular to systems enabling the coupling of a rotary compressor-expander to a reciprocator having multiple cylinders. Heretofore, for effective and efficient operation of a rotary compound engine it was necessary to utilize a single cylinder reciprocator as the reciprocal component in the rotary reciprocal combination. In addition, the rotary-reciprocal engine in this invention enables operation of the engine with a conventional turbo charger throughout a wide range of operating speeds without loss of compression charge to the reciprocator at low speeds.

In resolving the first problem, the adaptation of a positive displacement rotary compressor-expander or rotosupercharger to a multicylinder reciprocator, a rotating exhaust distributor having select passages for timed coupling of individual cylinders with the expander is utilized. In the compressor side, a flap valve prevents back flow of compressed air. In this manner the use of an energetically inefficient manifold is avoided and a system having the advantages of a single cylinder single reciprocator and coupled rotosupercharger is devised to fully utilize the potential and kinetic energy developed by the high pressure reciprocator and mid pressure rotosupercharger or rotocharger.

To resolve the problem of a turbocharged, compound engine where the turbocharger fails to deliver the necessary compression of intake air under low operating conditions, a variable displacement compression chamber is utilized in the positive-displacement, rotocharger. Since in a balanced rotary engine of a Wankel type, the compression displacement substantially equals the expansion displacement, air is overcompressed if the full compression capability of the unit is utilized. Therefore, by reducing the effective size of the compression displacement at peak operating conditions, a reserve is provided for low operating speeds where an auxiliary turbocharger fails to deliver air under any significant compression. In this manner, by increasing the effective compression displacement of the positive displacement rotary compressor, air at an appropriate compression level is delivered to the reciprocator throughout all possible ranges of operating conditions.

In resolving the problem of over expansion of combustion gases exhausted from the reciprocator to the positive displacement rotary expander at low operating speeds, a bypass is provided that is utilized whenever a negative pressure is about to be developed. The bypass can be operated by a simple pressure differential valve or an electronic servo valve.

To resolve the problem of backflow, a flap valve is used to prevent communication of the compressed air in the rotary component until it exceeds the pressure in the operating cylinder and its connecting passages.

These and other improvements permit the concepts of my rotary-reciprocal compound engine to be applied to a reciprocator component having multiple cylinders operable under a full range of operating conditions at maximum efficiency when coupled to a rotocharger.

DETAILED DESCRIPTION OF THE PREFERRED EMBODIMENTS

Figure 1:
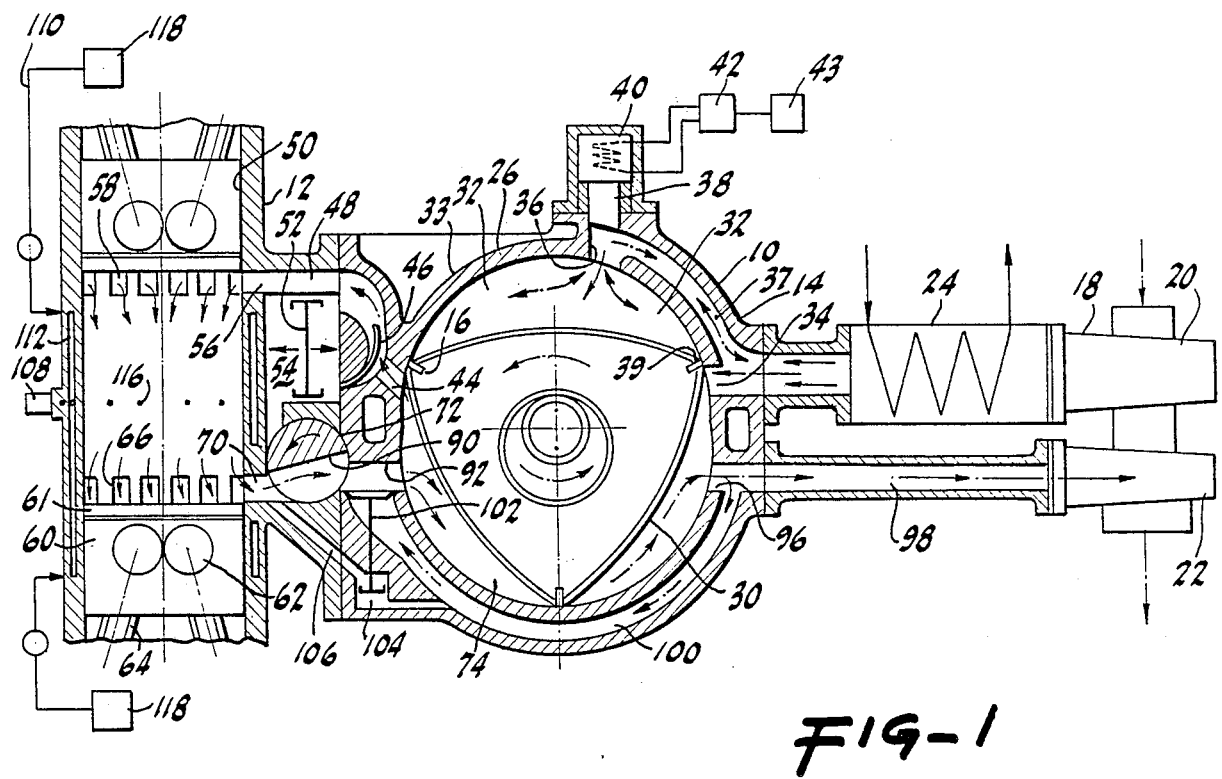
FIG. 1 is a cross sectional view of the compound engine with coupled turbocharger.
Figure 2:
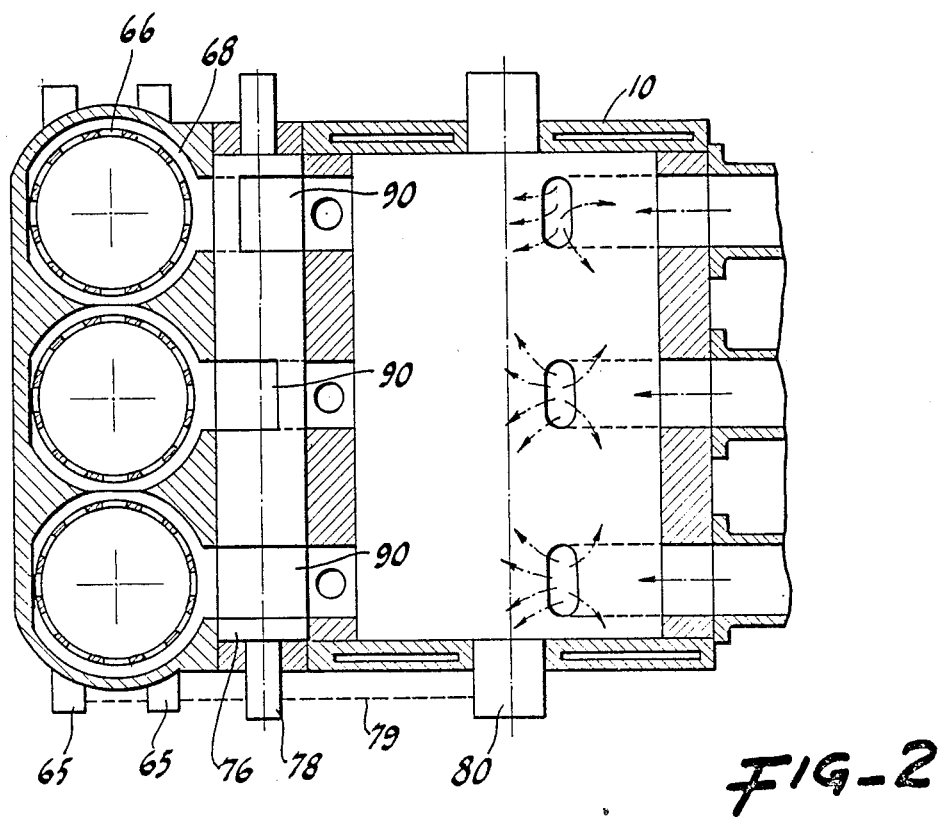
FIG. 2 is a cross sectional view of a portion of the compound engine of FIG. 1.

Referring now to FIGS. 1 and 2 the first embodiment of the multiple cylinder, rotary-reciprocal compound engine is shown. The engine designated generally by the numeral 10 includes three primary components in a unitary coupling that provides a thermodynamic cascade. At the high end is a reciprocator 12 designed to develop peak pressures of approximately 300 bars. The reciprocator 12 is coupled to a positive displacement rotary compressor-expander 14. The rotary compressor-expander or rotocharger operates in a mid pressure range limited by the effectiveness of its rotor seals 16. The rotocharger 14 is in turn coupled to a low pressure turbocharger 18. The turbocharger 18 has a compressor side 20 and an expander side 22 and operates between atmospheric and low range pressures.

Interposed between the compressor side of the turbocharger 18 and the compressor side of the rotocharger 14 is an intercooler 24 for reducing the temperature and volume of gas delivered to the compressor side 26 of the rotocharger 14. The rotorcharger 14 is a modified Wankel-type epitrochoidal, rotary compressor-expander that operates as an effective positive displacement booster between the turbocharger 18 and the reciprocator 12. Because of its symmetrical configuration for both compression and expansion sides of the rotary device, the device has an excessive compression capacity for its useful expansion displacement. By reducing this capacity at its peak operating condition, an availability of extra compression capacity exists for low engine speed conditions, where the turbocharger is ineffective in providing a necessary pressure boost to charge and scavenge the cylinder. Furthermore, being a positive displacement device, situations of negative expansions can arise during idle conditions where insufficient combustion gases are provided to drive the rotor 30 throughout its full expansion cycle.

Figure 5:
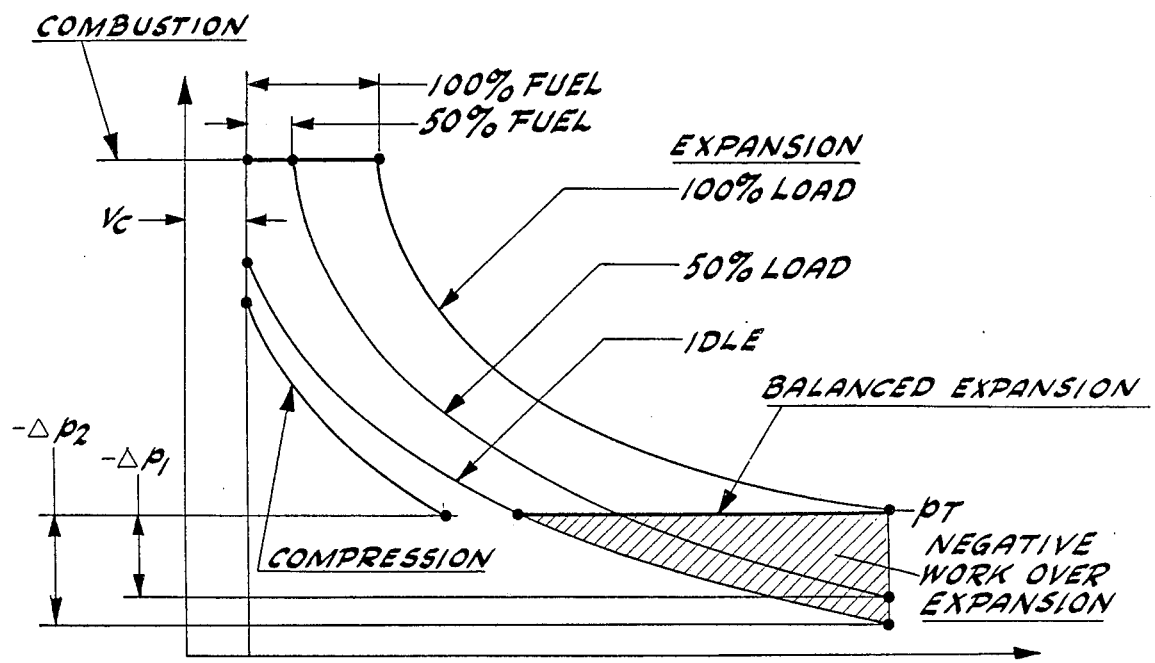
FIG. 5 is a P-V diagram of the compound engine cycle.
Figure 6:
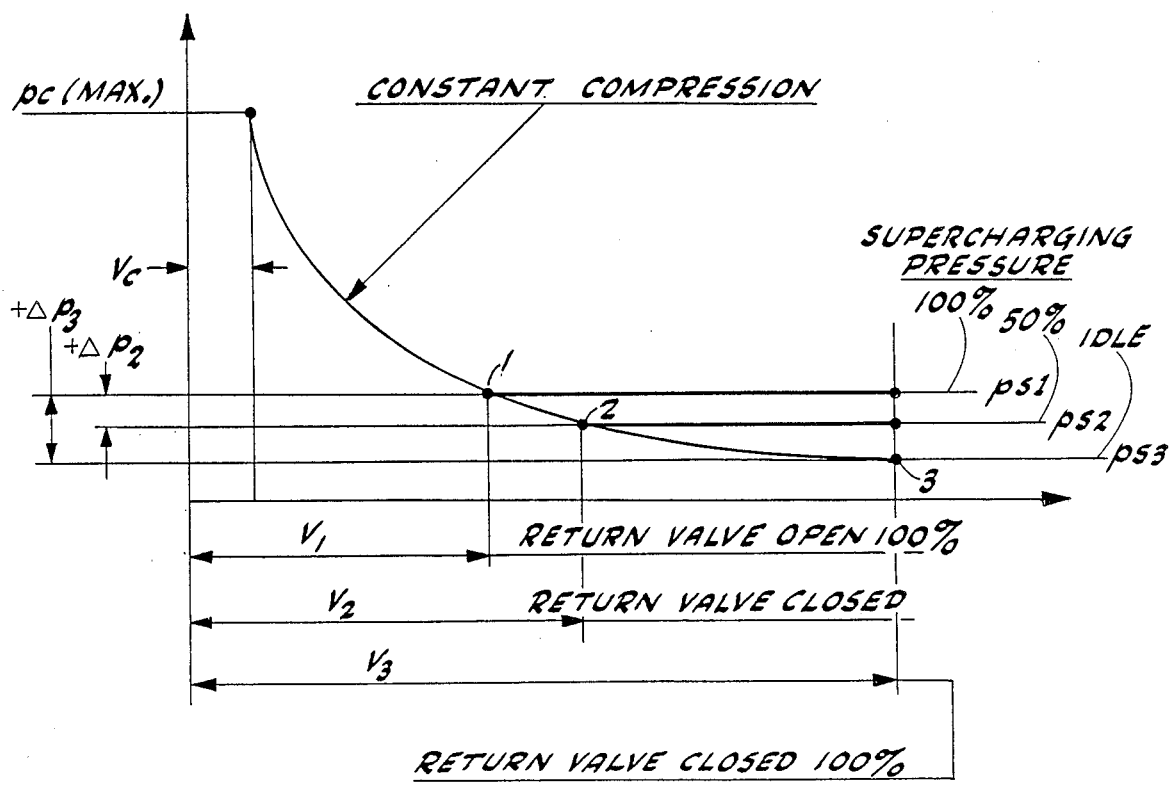
FIG. 6 is a P-V diagram of the compound engine cycle with variable volume compression.

These deficiencies and the solutions are effectively represented in the diagrams of FIGS. 5 and 6. In FIG. 5, a P-V diagram of the three component system is shown with the resultant negative pressure developed on less than full load for a system designed for optimum efficiency at optimum load. The balanced expansion line in the diagram shows the corrective path that can be obtained using a pressure relief in the expander.

In FIG. 6 a P-V diagram is shown, diagrammatically illustrating the solution for undercompression at idle speeds by incorporating a variable-volume, positive-displacement compressor into the system.

In correcting these deficiencies the compression chamber 32 formed within the housing 33 of the compressor side of the rotocharger includes a conventional intake port 34 and a novel bypass port 36 with a bypass passage 37 that leads back to the intake port. The bypass port 36 is regulated by a plunger valve 38 actuated by an electronic servo control 40 according to signals provided from a microprocessor 42 which senses engine operating conditions from sensor 43. By controlled regulation of the bypass port 36, backflow through the bypass passage 37 can be regulated until the rotor apex 39 passes the bypass port 36. The bypass port in the configuration of FIG. 1 is located such that approximately two-thirds of the effective volume of the compression chamber 32 can be lost via the bypass port 36 throughout the cycle. This volume is adjustable to the point that when the plunger valve 38 closes the bypass port 36, for example in slow speed idle operations, the entire volume of the chamber 32 is effectively available for compression on displacement by the rotating rotor 30.

Compressed air from the rotocharger 14 is delivered to an exit port 44 that is guarded by a one-way, flap valve 46 to prevent backflow into the chamber particularly during the initial stages of the compression. The exit port 44 communicates with a feeder passage 48 to each of the separate cylinders 50 of the reciprocator 12. The exit port 44 also communicates with one side of a free floating piston 52 which assist in minimizing losses resulting from the added dead volume from the feeder passages and passage volume of the exit port. The floating piston 52 displaces back and forth in a chamber 54 according to the pressure differential from compressed air on one side and reciprocator exhaust pressure on the opposite side resulting in the piston movements further explained hereafter. The feeder passages communicate with an annular chamber 56 around the top of each cylinder 50 for uniform and high volume entry of compressed air into the working chamber of the particular cylinder having retracted pistons which have exposed the intake ports 58 for receiving the compressed air according to the coordinated, timed cycle operation.

In the preferred embodiments, a multicylinder arrangement is shown that utilizes an opposed piston configuration with pistons 60 with oppositely facing piston heads 61, the pistons having dual rolling wrist pins 62 connected to double connecting rods 64 which in turn connect to oppositely rotating crank shafts therein 65 as described in great detail in the reference patent application. The compressed air entering intake ports 58 scavenges the expanded combustion gases through exhaust ports 66. The exhaust passes from an annular exhaust chamber 68 communicating with the exhaust ports to a feeder passage 70 of a rotary distributor 72 which selectively connects each cylinder exhaust directly to the exhaust chamber 74 of the roto-charger 14 according to the cycle operation. The rotary distributor 72 as shown in FIG. 2 comprises an elongated shaft 76 with end journals 78 one of which is appropriately connected with a gear mechanism 79 (shown schematically) to the shaft 80 of the roto-charger 14. The rotation of the rotocharger is timed with the sequential reciprocation of the pistons by gearing the reciprocator shafts 65 to the shaft 80 of the rotorcharger by gear mechanism 79, as schematically shown in FIG. 2, or by electronic timing means. The distributor shaft 76 includes a set of three angularly displaced grooves 90 which, as shown in FIG. 1, allow passage of exhaust gas from the reciprocator to the roto-charger when properly aligned with the exhaust intake 92 of the rotocharger 14. The shaft 76 is properly set and timed to provide communication of a select cylinder of the reciprocator with the rotocharger when the exhaust ports 66 are exposed by the retracted pistons 60.

The rotary distributor 92 is also arranged with respect to the chamber 54 housing the free floating piston 52, such that a charge of high pressure exhaust gas is first distributed to the free floating piston chamber 54 to displace the piston and boost the compression pressure of the feed air a moment before communication of the exhaust with the rotocharger is accomplished. This equalizing pressure boost compensates for any dead space volume loss that adversely affects the compressor efficiency, and provides a pressure boost the moment before the intake ports 58 are exposed.

The expanding exhaust gases drive the rotor 30 of the rotocharger and exhaust through exit port 96 to the expander side of the turbocharger 18 through exhaust conduit 98.

During conditions of slow speed and low load it may be that the expansion gases are insufficient to fill the exhaust chamber 74 of the rotocharger 14 as the rotor rotates and expands the chamber volume. In such cases the driven rotor 30 will cause a negative expansion and a consequential loss of energy and work. To prevent such from occurring a return bypass passage 100 connects the exhaust port 96 with the exhaust intake port 92 through a poppet valve 102 that is controlled by a pressure differential system 104 having one side connected to the exhaust chamber 74 through passage 106 and the other side connected to the bypass passage 100. When the pressure in the exhaust line 98 exceeds that of the exhaust chamber 74 a backflow occurs to relieve the pressure. In this manner pressure below atmospheric does not occur in the expansion chamber.

The engine is designed to operate as a two-cycle diesel engine with fuel injectors 108 spaced around the central portion of the cylinder supplied by a fuel line 110 that is preheated in a cylinder wall passage 112 before being supplied to the injector and introduced into the cylinder. In the preferred embodiment the cylinders 50 are also provided with a water supply for cogeneration wherein the water is also supplied to a cooling passage around the cylinder before being supplied to one or more water injectors 116 for injection of water into the cylinder at an optimum time. Both fuel and water injection are controlled by a microprocessor 118.

Figure 3:
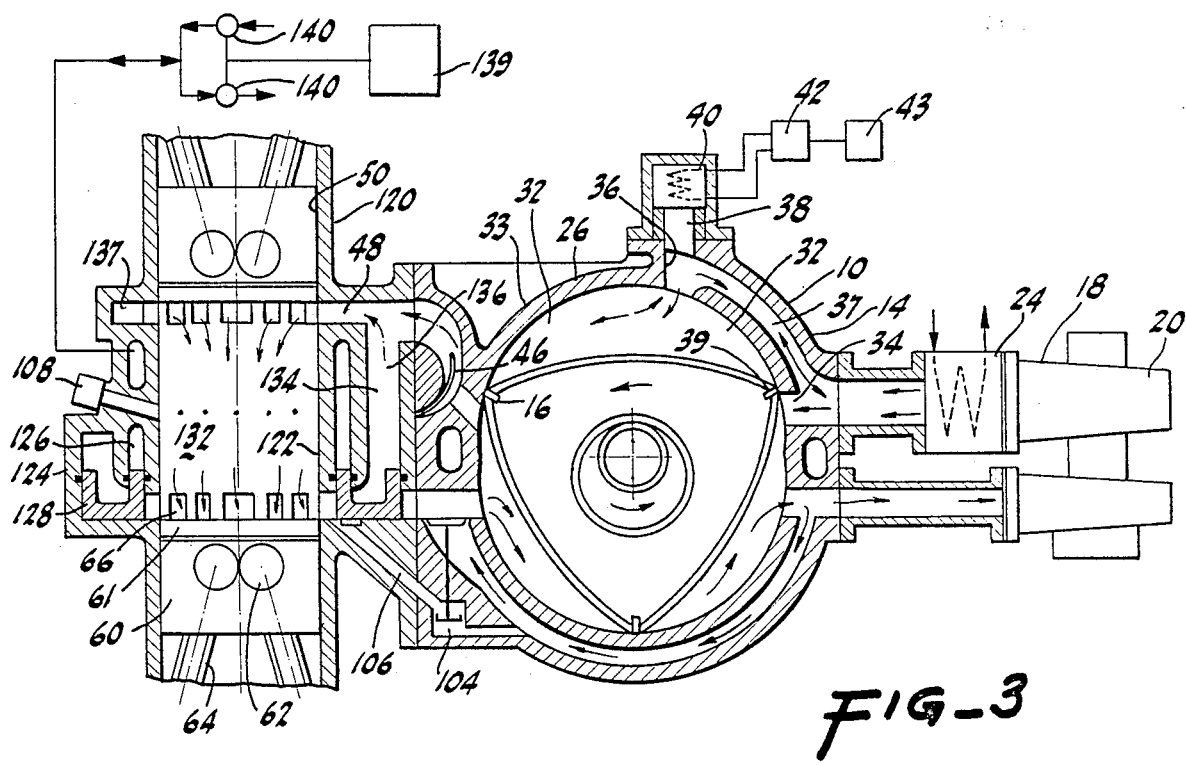
FIG. 3 is a cross sectional view of an alternate embodiment of the compound engine.
Figure 4:
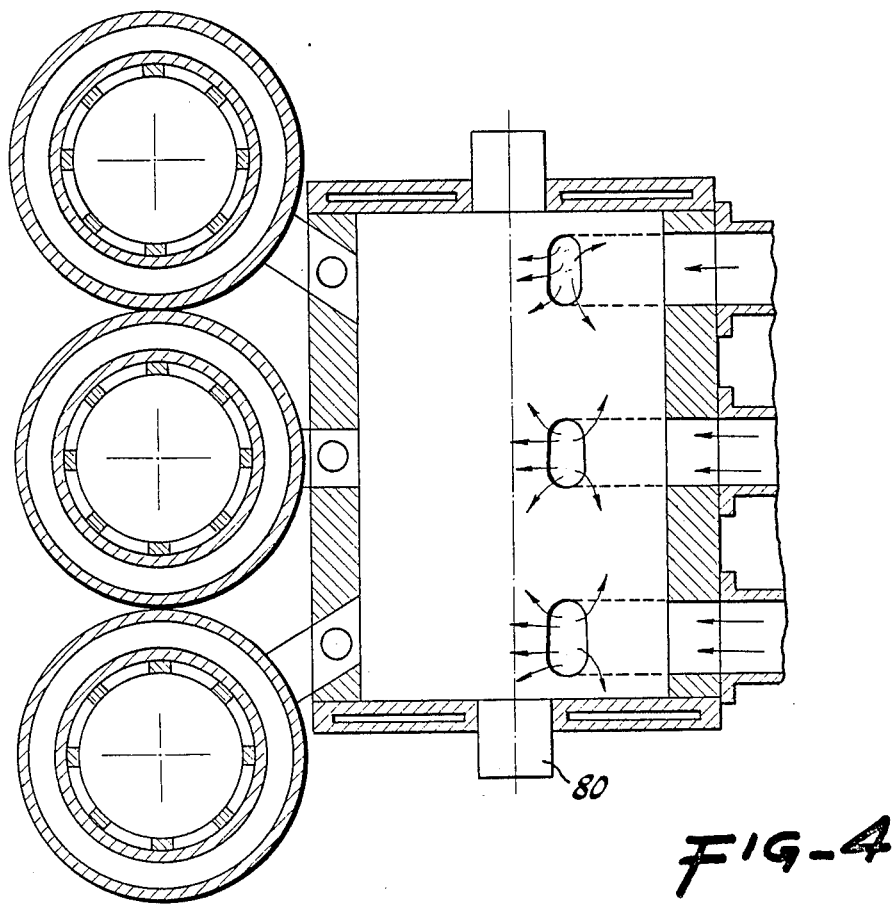
FIG. 4 is a cross sectional view of a portion of the compound engine of FIG. 3.

Referring now to the modified embodiments to the FIGS. 2 and 3 substantially the same arrangement is shown. A turbocharger 18 is connected to a rotocharger 14 which has identical bypass systems as provided for the rotochargers of FIGS. 1 and 2. The rotocharger 14 is coupled to a reciprocator 120 that is substantially the same as reciprocator 12 of the earlier embodiment. The reciprocator 120 includes a cylinder 122 containing opposed pistons 60 similarly constructed and arranged as in the prior embodiment. A reciprocator housing 124 is constructed to include a hydraulic chamber 126 that receives a reciprocating annular slide valve 128 that is constructed to block the exhaust ports 130 of the cylinder 122. The annular slide valve 128 also acts as a piston for providing a pressure boost to the compressed air prior to introduction into the cylinder chamber 132. In this manner the slide valve takes the place of the floating piston. This pressure boost is accomplished by an air chamber 134 on one side of the slide valve that communicates via the passage 136 to an annular intake chamber 138 around the intake ports of the cylinder 122. The slide valve 128 is displaced by high pressure combustion gases which contact the underside of the slide valve through the communication passage 137. Displacement is restrained or prevented by the hydraulic pressure in the hydraulic chamber 126 which is regulated by a microprocessor 139 and electronically regulated control valves 140 shown schematically in FIG. 3. In this manner exhaust advance or retardation and the effective area of the exhaust ports can be manipulated under control of the microprocessor.

The various systems described combined to form a highly efficient engine that couples a multicylinder reciprocator to a positive displacement, rotary compressor-expander or rotocharger for operation throughout the normal operating range of a common vehicle. Certain of the bypass systems may be discarded where the engine is designed for constant high speed operation, for example in use as a generator. The engine can also be operated with or without the water cogeneration system.

While the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A compound, rotary-reciprocal engine comprising:
   a two-cycle reciprocator having a plurality of cylinders, each cylinder having at least one piston arranged for reciprocation in the cylinder in a cycled operation with a timed air input to the cylinder and a timed exhaust from the cylinder;

a compressed air intake and combustion gas exit in each cylinder of the reciprocator;

fuel injection means for injecting fuel into the cylinders at appropriate times in the cycled operation; and, a rotocharger which comprises:

a positive displacement, periodic, rotary compressor-expander having a housing containing a rotor means rotated by combustion gases for compressing air in a periodic cycled operation, the housing including at least one air intake passage and at least one air exit passage, the rotor means being arranged to compress air entering the intake passage with the compressed air exiting the air exit passage in multiple periods during each cycle of operation, and including combustion gas intake and exit passages, the rotor means being arranged for periodic cycled rotation by expanding combustion gases entering the combustion gas intake passage and exiting the combustion gas exit passage in multiple periods during each cycle of operation;

wherein the two-cycle reciprocator is coupled to the positive displacement rotary compressor-expander with the air exit passage of the compressor-expander connected to the compressed air intake of the reciprocator with timed delivery of compressed air charges to each cylinder of the reciprocator, and the combustion gas intake passage of the compressor-expander connected to the combustion gas exit of the reciprocator with timed intake of exhausted combustion gases from each cylinder of the reciprocator;

wherein the rotary-reciprocal engine includes connecting means for connecting the two-cycle reciprocator to the positive displacement rotary compressor-expander with the cycled operation of the reciprocator timed with the cycled operation of the rotocharger for an integrated cycle operation with select cylinders of the reciprocator being in sequential periodic communication with the rotocharger during each period of the cycled operation of the rotocharger for timed delivery of compressed air to the cylinder and timed receipt of combustion gases from the cylinder that substantially matches the timed air input to the cylinder and the timed gas exhaust from the cylinder; and, wherein the compressor-expander is of epitrochoidal configuration with a compression chamber and an expansion chamber each having a volume displaced by the rotor means on rotation of the rotor means, the compression chamber having the air intake passage located at one end of the compression chamber and the air exit passage located at the other end of the compression chamber, wherein air entering the air intake passage is compressed by displacement of the rotor means as the compressed air is transported to the air exit passage by rotation of the rotor means, the expansion chamber having a combustion gas intake passage located at one end of the expansion chamber and a combustion gas exit passage located at the other end of the expansion chamber, wherein combustion gases entering the combustion gas intake passage are expanded displacing the rotor means as the combustion gases are transported to the combustion gas exit passage by rotation of the rotor means, the compressor-expander including further, a bypass passage located around the expansion chamber connecting the combustion gas intake passage and the combustion gas exit passage.

2. The compound engine of claim 1 wherein the bypass passage has valve means for connecting the combustion gas intake passage with the combustion gas exit passage when pressure at the combustion gas exit passage exceeds the pressure at the combustion gas intake passage.

3. The compound engine of claim 2 wherein the valve means includes a pressure differential actuator means for activating the valve means in response to pressure differential.

4. A compound, rotary-reciprocal engine comprising:

a two-cycle reciprocator having a plurality of cylinders, each cylinder having at least one piston arranged for reciprocation in the cylinder in a cycled operation with a timed air input to the cylinder and a timed exhaust from the cylinder;

a compressed air intake and combustion gas exit in each cylinder of the reciprocator;

fuel injection means for injecting fuel into the cylinders at appropriate times in the cycled operation; and, a rotocharger which comprises:

a positive displacement, periodic, rotary compressor-expander having a housing containing a rotor means rotated by combustion gases for compressing air in a periodic cycled operation, the housing including at least one air intake passage and at least one air exit passage, the rotor means being arranged to compress air entering the intake passage with the compressed air exiting the air exit passage in multiple periods during each cycle of operation, and including combustion gas intake and exit passages, the rotor means being arranged for periodic cycled rotation by expanding combustion gases entering the combustion gas intake passage and exiting the combustion gas exit passage in multiple periods during each cycle of operation; the two-cycle reciprocator is coupled to the positive displacement rotary compressor-expander with the air exit passage of the compressor-expander connected to the compressed air intake of the reciprocator with timed delivery of compressed air charges to each cylinder of the reciprocator and the combustion gas intake passage of the compressor-expander connected to the combustion gas exit of the reciprocator with timed intake of exhausted combustion gases from each cylinder of the reciprocator;

wherein the rotary-reciprocal engine includes connecting means for connecting the two-cycle reciprocator to the positive displacement rotary compressor-expander with the cycled operation of the reciprocator timed with the cycled operation of the rotocharger for an integrated cycle operation with select cylinders of the reciprocator being in sequential periodic communication with the rotocharger during each period of the cycled operation of the rotocharger for timed delivery of compressed air to the cylinder and timed receipt of combustion gases from the cylinder that substantially matches the timed air input to the cylinder and the timed gas exhaust from the cylinder; and wherein the reciprocator cylinders have an intake end and an exhaust end opposite the intake end, the compressed air intake being located at the intake end and the combustion gas exit being located at the exhaust end, wherein a chamber external to the cylinder is included with a displaceable piston means for pressure equalization, the piston means dividing the chamber into a first side in communication with the compressed air intake and a second side in communication with the combustion gas exit.

5. The compound engine of claim 4 wherein the piston means is a floating piston that displaces on a pressure differential between one side of the chamber and the other side of the chamber.

6. The compound engine of claim 4 wherein the piston means is a displaceable annular slide valve around the cylinder, blocking the exhaust exit, the displaceable annular slide valve including a hydraulic actuating means wherein the valve is displaceable in a first direction by pressure of exhaust gases under the valve and displaceable in a second direction by compressed air over the valve, said actuating means controllably restraining displacement in the first direction under regulation of an electronic control means.

7. The compound engine of claim 6 wherein the control means is actuated by a microprocessor for controlling the exhaust flow according to operating conditions.

8. A compound, rotary-reciprocal engine comprising:
a two-cycle reciprocator having a plurality of cylinders, each cylinder having at least one piston arranged for reciprocation in the cylinder in a cycled operation with a timed air input to the cylinder and a timed exhaust from the cylinder;
a compressed air intake and combustion gas exit in each cylinder of the reciprocator;
fuel injection means for injecting fuel into the cylinders at appropriate times in the cycled operation; and,
a rotocharger which comprises:
a positive displacement, periodic, rotary compressor-expander having a housing containing a rotor means rotated by combustion gases for compressing air in a periodic cycled operation, the housing including at least one air intake passage and at least one air exit passage, the rotor means being arranged to compress air entering the intake passage, the compressed air exiting the air exit passage in multiple periods during each cycle of operation, and including combustion gas intake and exit passages, the rotor means being arranged for periodic cycled rotation by expanding combustion gases entering the combustion gas intake passage and exiting the combustion gas exit passage in multiple periods during each cycle of operation;
wherein the two-cycle reciprocator is coupled to the positive displacement rotary compressor-expander with the air exit passage of the compressor-expander connected to the compressed air intake of the reciprocator with timed delivery of compressed air charges to each cylinder of the reciprocator and the combustion gas intake to each cylinder of the reciprocator and the combustion gas intake passage of the compressor-expander connected to the combustion gas exit of the reciprocator with timed intake of exhausted combustion gases from each cylinder of the reciprocator;
wherein the rotary-reciprocal engine includes connecting means for connecting the two-cycle reciprocator to the positive displacement rotary compressor-expander with the cycled operation of the reciprocator timed with the cycled operation of the rotocharger for an integrated cycle operation with select cylinders of the reciprocator being in sequential periodic communication with the rotocharger during each period of the cycled operation of the rotocharger for timed delivery of compressed air to the cylinder and timed receipt of combustion gases from the cylinder that substantially matches the timed air input to the cylinder and the timed gas exhaust from the cylinder; and includes a rotary distributor interposed between the combustion gas exit of each cylinder and the combustion gas intake passage of the rotocharger, the rotary distributor being timed with the rotocharger cycle operation for selectively and sequentially connecting the gas exit of each cylinder with the gas intake passage of the rotocharger.

9. A compound, rotary-reciprocal engine comprising:
a two-cycle reciprocator having a plurality of cylinders, each cylinder having at least one piston arranged for reciprocation in the cylinder in a cycled operation with a timed air input to the cylinder and a timed exhaust from the cylinder;
a compressed air intake and combustion gas exit in each cylinder of the reciprocator;
fuel injection means for injecting fuel into the cylinders at appropriate times in the cycled operation; and,
a rotocharger which comprises:
a positive displacement, periodic, rotary compressor-expander having a housing containing a rotor means rotated by combustion gases for compressing air in a periodic cycled operation, the housing including at least one air intake passage and at least one air exit passage, the rotor means being arranged to compress air entering the intake passage with the compressed air exiting the air exit passage in multiple periods during each cycle of operation, and including combustion gas intake and exit passages, the rotor means being arranged for periodic cycled rotation by expanding combustion gases entering the combustion gas intake passage and exiting the combustion gas exit passage in multiple periods during each cycle of operation;
wherein the two-cycle reciprocator is coupled to the positive displacement rotary compressor-expander with the air exit passage of the compressor-expander connected to the compressed air intake of the reciprocator with timed delivery of compressed air charges to each cylinder of the reciprocator and the combustion gas intake to each cylinder of the reciprocator and the combustion gas intake passage of the compressor-expander connected to the combustion gas exit of the reciprocator with timed intake of exhausted combustion gases from each cylinder of the reciprocator;
wherein the rotary-reciprocal engine includes connecting means for connecting the two-cycle reciprocator to the positive displacement rotary compressor-expander with the cycled operation of the reciprocator timed with the cycled operation of the rotocharger for an integrated cycle operation with select cylinders of the reciprocator being in sequential periodic communication with the rotocharger during each period of the cycled operation of the rotocharger for timed delivery of compressed air to the cylinder and timed receipt of combustion gases from the cylinder that substantially matches the timed air input to the cylinder and the timed gas exhaust from the cylinder; and wherein the reciprocator has cylinders with opposed pistons with facing piston heads, the cylinder and piston head forming the working chamber with at least one fuel injector mounted on the cylinder to inject fuel into the working chamber midway between the piston heads of the opposed pistons.

10. The compound engine of claim 9 wherein the cylinders each have at least one cooling jacket around the working chamber for preheating at least one fluid injected into the working chamber.

11. The compound engine of claim 10 wherein fluids injected into the working chamber are controlled in quantity and timing by a microprocessor.

12. The compound engine of claim 9 wherein each of the pistons is connected to double connecting rods with dual rolling wrist pins for high pressure performance.

* * * * *